United States Patent [19]

Mathewes et al.

[11] 4,451,272
[45] May 29, 1984

[54] MOVING BED FILTER, ESPECIALLY AN ADSORPTION FILTER

[75] Inventors: Wolfgang Mathewes, Giessen; Peter W. Hayn, Berlin, both of Fed. Rep. of Germany

[73] Assignee: Kraftwerk Union Aktiengesellschaft, Mülheim, Fed. Rep. of Germany

[21] Appl. No.: 462,012

[22] Filed: Jan. 28, 1983

[30] Foreign Application Priority Data

Jan. 29, 1982 [DE] Fed. Rep. of Germany ....... 3202845
Aug. 3, 1982 [DE] Fed. Rep. of Germany ....... 3228984

[51] Int. Cl.³ ............................................. B01D 53/08
[52] U.S. Cl. ........................................ 55/390; 34/170; 55/474; 422/219
[58] Field of Search ............... 34/80, 167, 170; 55/34, 55/60, 77, 79, 99, 181, 390, 474; 422/176, 213, 215, 219, 220

[56] References Cited

U.S. PATENT DOCUMENTS

| | | | |
|---|---|---|---|
| 1,095,676 | 5/1914 | Rigg | 34/170 X |
| 1,685,338 | 9/1928 | Randolph | 34/170 |
| 2,148,946 | 2/1939 | Hubmann et al. | 34/170 X |
| 2,423,013 | 6/1947 | Evans | 55/390 X |
| 2,577,791 | 12/1951 | McKinney | 422/219 X |
| 2,656,007 | 10/1953 | Arnold et al. | 34/170 X |
| 2,816,010 | 12/1957 | Shabaker | 34/170 X |
| 3,561,927 | 2/1971 | Jones, Jr. | 55/390 X |
| 3,598,539 | 8/1971 | Pizzato | 422/220 |

FOREIGN PATENT DOCUMENTS

| | | | |
|---|---|---|---|
| 883598 | 3/1954 | Fed. Rep. of Germany | 55/390 |
| 914125 | 11/1954 | Fed. Rep. of Germany | 55/390 |
| 922345 | 1/1955 | Fed. Rep. of Germany | 55/79 |
| 2625275 | 6/1978 | Fed. Rep. of Germany | |
| 847768 | 10/1939 | France | 55/79 |
| 588297 | 5/1947 | United Kingdom | |

*Primary Examiner*—Robert H. Spitzer
*Attorney, Agent, or Firm*—Herbert L. Lerner; Laurence A. Greenberg

[57] ABSTRACT

Moving bed filter for purifying a fluid formed of gas and/or vapor, the filter having a flow of loose particulate material downwardly from above, and a continuous flow upwardly from below of a fluid to be filtered, and including a container filled with the loose particulate material and having at least one closeable inlet opening at the top thereof for introducing the loose particulate material, and a downwardly tapering bottom having a closeable outlet port for discharging the loose particulate material, fluid inlet ports disposed in a bottom region and fluid exhaust tubes arranged in an upper region of the container and extending parallel to one another from one container wall to the opposite container wall, and being provided at inflow and at outflow sides thereof with an upper roof cover and a lower V-profile cover, respectively, serving as a flow-equalizing symmetrical flow guide element for the loose particulate material, a support grate formed of downwardly directed V-shaped cover of sieve-like construction connected at each fluid exhaust tube to the upper cover thereof forming a roof-shaped symmetrical flow-guide element, the upper covers being spaced a distance of four to ten times the width of the roof gap between each two adjacent flow guide elements and between a flow-guide element and the container wall, respectively, roof edges of each upper cover projecting beyond the respective downwardly directed V-shaped cover, and sliders disposed at the underside of the support grate for closing the lower roof gaps between the louver-like roofs.

20 Claims, 6 Drawing Figures

MOVING BED FILTER, ESPECIALLY AN ADSORPTION FILTER

The invention relates to a moving bed filter for purifying a fluid medium formed of gas and/or vapor, especially an adsorption filter having a flow of loose particulate material and adsorption material, respectively, preferably discontinuously downwardly from above, and a continuous flow upwardly from below of a gaseous medium to be filtered, and including a container filled with the loose particulate or adsorption material and having at least one closeable inlet opening at the top thereof for introducing the loose particulate or adsorption material, and a downwardly tapering bottom having a closeable outlet port for discharging the loose particulate or adsorption material, gas inlet ports disposed in a bottom region and exhaust gas tubes arranged in an upper region of the container and extending parallel to one another from one container wall to the opposite container wall and being provided at inflow and at outflow sides thereof with an upper roof cover and a lower V-profile cover, respectively, serving as a flow-equalizing symmetrical flow guide element for the loose particulate or adsorption material, and additional components disposed in the lower region of the container in the form of a support grate for equalizing flow behavior of the loose particulate or adsorption material over the whole cross section of the container. It lies, consequently, in the field of filter technology, and is to be applied in the constructive configuration of an adsorption filter, wherein the adsorption medium, especially a medium in the form of active charcoal particles with dimensions in millimeters, flows discontinuously downwardly from above, and the gas to be filtered flows continuously upwardly from below.

An adsorption filter of this type is known from German Pat. (DE-PS) 26 25 275. It is formed of a rectangular housing filled with the adsorption medium and includes at the top thereof a closeable inlet opening for introducing the adsorption medium, and it has a downwardly tapering bottom section with a closeable discharge or outlet opening for the adsorption medium. The feed-lines for the gas which is to be filtered are located in the bottom region. In the upper region of the container, on the other hand, gas-discharge or exhaust tubes for the filtered gas are arranged extending parallel to one another from one container wall to the opposite container wall. In the lower and upper regions of the container, components are provided for making the flow behavior of the adsorption medium more uniform over the whole cross-section of the housing. In the upper region of the container, the gas-discharge tubes are provided with a roof or V-profile at the inflowing and outflowing sides thereof, and serve as flow equalizing components. In the lower region of the container, the components are formed of a support grate having a rectangular throughput opening for the adsorption medium and for the gas to be filtered, the opening being uniformly distributed over the whole cross-section. This support grate is arranged above the discharge or outlet opening for the adsorption medium and above the inlet opening for the gas which is to be filtered, and the grate should effect a markedly uniform downward movement of the adsorption medium when the outlet or discharge opening is opened.

The invention relates to a further development of this heretofore known adsorption filter with the objective of achieving a higher uniformity of the flow of the filtering-layer. It was established that the essential factors are the flow-dynamic configuration and arrangement of the upper and lower structural components, the flow-through cross sections thereof and the throughput control elements. According to the invention, an additional improvement of the flow behavior of the filter layer during the exchange or partial renewal thereof is attained in the sense of the desired ideal flow in plane parallel laminar layers (piston flow and flow in contrast to core or centralized flow, respectively).

In another heretofore know adsorption filter according to British Pat. No. 588,297, a support grate with roof-shaped structural components is provided in the lower region of the housing, slotted rotatable cylinders rotary sliders divided into sectors being provided between adjacent roof-edges with which spent adsorption medium is dischargeable in portions. A definite removal or discharge of the adsorption medium layer by layer is not possible with this arrangement. The reasons for this are the following: The support grating permits only the discharge limited by the volume of the rotatable cylinder or slider per rotation. A great number of rotations must be performed to discharge a layer of the particulate material. Since the rotatable cylinders in the heretofore known filter can be operated independently of one another, this alone can cause a non-uniform lowering of the individual layers within the bulk material and the filter bed, respectively.

In a further heretofore known adsorption filter according to German Pat. No. 883,598, an effort is made to achieve a continuous, uniform lowering of the adsorption medium in the treatment zone by arranging a sluice-like device in the lower region of the container, which is followed by a regulating device. This sluice-like device is formed of roof-shaped guide surfaces, which may be constructed in the form of louvers, as well as barrier or obstructing surfaces which are disposed below adjacent roof edges. The barrier surfaces prevent free-falling passage of the adsorption medium, and permit only a slow trickling-down thereof from the formed natural slopes. The succeeding regulating device is formed of a fixed and a slidable bottom, which are both provided with openings. The extent to which these openings overlap is adjustable, so that always the respectively selected amount of adsorption medium can be discharged.

Due to these horizontal barrier surfaces which are arranged in the region of the roof gaps between the louver-like roofs, so-called dead zones of the bulk material can form, which result in an uneven loading of the filter layer located thereabove. Furthermore, the equalizing effect of the sluice-like device is inhibited by the fact that the regulating device which is arranged at a relatively great distance from the sluice-like device, below the latter, causes a back-up or congestion, which prevents free-fall of the particulate material, and the adsorption medium, respectively, as it passes through the sluice-like device. However, the latter can only achieve its equalizing effect fully, if the particles, after passing therethrough, can move a short distance freely falling. Also this heretofore known adsorption filter does not include all features of filter described in the introduction hereto; in particular, there are no provisions of gas discharge tubes arranged in the upper region of the container extending in parallel from one container wall to the opposite container wall with peak roof and profile covers, respectively, at the inflowing and outflowing sides, so that the flow-equalizing effect thereof is utilized as symmetrical flow guide elements for the adsorption medium. Finally, attention is drawn to the moving bed adsorption filter according to U.S. Pat. No. 1,095,676 which has, below and above the filter layer, a respective support grate with T-rails arranged axially parallel to one another, with longitudinal throughput slots provided between the rails and, above the longitudinal slots, roof-shaped flow guide elements (with an inverted V-profile). In the end region of the flow-guide elements above the T-rails and below the flow guides, guide ledges extend parallel to the T-rails, which are connected by cross-bars. The cross-bars and, accordingly, the guide ledges are reciprocatingly movable transversely to the longitudinal direction of the elongated slots by an eccentric drive, and serve the purpose of causing the loose particulate material, which has normally come to rest on the surface of the T-rails due to the heap angle, to trickle downwardly. The disadvantage of this heretofore known filter lies mainly in the fact that the gas inlet zones (the gas to be cleaned flows upwardly from below) lies in the region of the slopes formed by the bulk poured material so that, on the one hand, the trickling motion of the material is inhibited by the gas flow and, on the other hand, just in this region, a very heavy loading occurs, whereas other filter zones are less heavily loaded.

It is accordingly an object of the invention to provide a moving-bed filter and especially an adsorption filter according to the aforedescribed type which avoids the hereinafore known filters of this general type i.e. especially that the interior of the filter container is so arranged that flowing movement of the poured particulate material is not inhibited by the gas or vapor flow, no uneven or non-uniform loading of the loose particular material can occur in the in-flowing region of the support grate; no dead zones of the loose particulate material can form in the region of the support grate; a back-up or damming of the bulk material and the filter material respectively, from the bottom region of the filter container to the support grate with its throughput element is avoided so that, positively expressed, the new moving bed filter, especially, the adsorption filter, is improved with respect to the economical use of the adsorption medium, and with a constant height of the effective filter layer, there can always be a layer-by-layer discharge or removal of the adsorption medium, and an uniform loading of the filter layer upwardly from below can be effected.

With the foregoing and other objects in view, there is provided, in accordance with the invention, a moving bed filter for purifying a fluid medium formed of gas and/or vapor, the filter having a flow of loose particulate material downwardly from above, and a continuous flow upwardly from below of a gaseous medium to be filtered, and including a container filled with the loose particulate material and having at least one closable inlet opening at the top thereof for introducing the loose particulate material, and a downwardly tapering bottom having a closeable outlet port for discharging the loose particulate material, gas inlet ports disposed in a bottom region and exhaust gas tubes arranged in an upper region of the container and extending parallel to one another from one container wall to the opposite container wall, and being provided at inflow and at outflow sides thereof with an upper roof cover and a lower V-profile cover, respectively, serving as a flow-equalizing symmetrical flow guide element for the loose particulate material, and additional components disposed in the lower region of the container in the form of a support grate for equalizing flow behavior of the loose particulate material over the whole cross section of the container, including a downwardly directed V-shaped cover of sieve-like construction connected at each fluid-medium exhaust tube to the upper cover thereof forming a roof-shaped symmetrical flow-guide element, the upper covers being spaced a distance of four to ten times the width of the roof gap between each two adjacent flow guide elements and between a flow-guide element and the container wall, respectively, roof edges of each upper cover projecting beyond the respective downwardly directed V-shaped cover, the support grate being formed of bipartite louver-like symmetrical roofs disposed vertically below each fluid-medium exhaust tube and parallel thereto in a manner that the mutual spacing of the axes thereof is four to ten times the width of the lower roof gaps between each two adjacent louver-like roofs and between a louver-like roof and the container wall, respectively, and sliders disposed at the underside of the support grate for closing the lower roof gaps between the louver-like roofs, the sliders being coupled with one another.

In accordance with another feature of the invention, the flow of loose particulate material is continuous.

In accordance with a further feature of the invention, the container has a rectangular cross section.

In accordance with an additional feature of the invention, the loose particulate material is an adsorption medium, and the filter is an adsorption filter.

In a filter constructed in this manner, the gas discharge tubes which are formed as flow-guide elements ensure that the supply of adsorption medium stored thereabove flows and trickles, respectively, uniformly distributed, into the effective and active region, respectively, of the filter. The louver-like roof-shaped structural components in the lower part of the container prevent the formation of bridges in the trickling adsorption medium, when the sliders are opened, and also prevent a so-called core-flow (Kernfluss) with which the adsorption medium preferably flows from given cross-sectional regions. The desired mass-flow (Massenfluss) of the adsorption medium, which is characterized by an uniform and relatively low sinking or lowering velocity, is furthermore assured in that by the integration of the sliders into the louver-like roof-shaped components of the support grate, a free space is formed below the latter, into which the adsorption medium can freely fall when the sliders are opened. Thus, a dynamic arch of trickling adsorption medium is formed between the louver-like room-shaped structural components. A precondition for this effect is that the volume in the bottom region of the housing be greater than the volume of the respective partial layer of the adsorption medium which is to be removed from the active filter region. If adsorption media are mentioned hereinafter, it is understood that this could also relate instead or also to regenerable filter materials or catalysts; consequently, the invention relates in general to moving bed filters for cleaning or purifying or for reacting with gaseous or vaporous media which can be operated either with continuous or with intermittent flow-through of the filter material. Preferably, it is concerned with an adsorption filter, which is of special importance for industrial installations, for example, for nuclear power plants.

The construction according to the invention thereby assures that the spent adsorption medium be separated from the adsorption filter in layers, and can be utilized in an especially effective manner.

Hereinafter, additional structural features of the invention are basically explained.

Depending upon the size of the adsorption filter, in accordance with yet another feature of the invention, the width of the roof gaps is between 15 and 50 mm.

In accordance with yet a further feature of the invention, the upper roof gap between two adjacent louver-like roofs is about 50 to 100 mm. For these dimensions, a corresponding spacing of the axes of the roof-shaped upper covers and of the roof-shaped components is from 100 to 500 mm. Thereby, small distances between axes results in a more uniform distribution and a more uniform downward movement of the adsorption medium. The grain size of the adsorption medium, especially of activated (charcoal) carbon particles, lies thereby in the mm-region. Preferably, small cylindrical particles of 1 to 2 mm length and 1 to 2 mm diameter are used; however, one can also use carbon scrap with approximately the same grain size.

In accordance with yet an additional feature of the invention, the roof gaps between the louver-like roofs, and/or the upper covers is substantially hyperbolically constricted from the side towards the center. This takes into account the friction losses which result from the friction of the adsorption medium at the container walls when the adsorption means are lowered.

The desired mass-flow of the adsorption medium can be further enhanced, in accordance with another feature of the invention, by providing additional flow-guide elements which are arranged above the lower roof gaps as well as between the roof-like upper parts of the louver-like roofs, and between these upper parts and the respective container walls.

According to other alternate features of the invention, these additional flow guide elements are shaped like a peaked roof, have a square diamond-shaped cross section or have a rectangular or round cross section. In the region of the lower structural components, these flow-guide elements equalize the path lengths of the individual particles during the discharge operation.

In accordance with a further feature of the invention, the peak angle of the surfaces of the V-shaped covers is smaller than the peak angle of the roof-shaped covers.

Furthermore, the mass flow and the desired free fall of the adsorption medium between the louver-like roof-shaped components and the bottom of the container may be improved by the shape and the motions for opening and closing the sliders. For this reason and, in accordance with an added feature of the invention, the sliders are slidable on both sides of the respective roof gaps. To influence thereby all zones in the region of a slot uniformly by the slider, a slider movement is provided, in accordance with an additional feature of the invention, wherein the sliders are slidable alternatingly to one side and then to the other side of the slots for opening the roof gaps. With this slider rhythm, each slot is first opened by a motion of the slider, for example, to the left-hand side, and thereafter closed by a motion to the right-hand side. Then, each slot is opened by a motion to the right-hand side and, thereafter, closed by a motion to the left-hand side. This type of motion is especially important, if adsorption medium layers of limited height are to be withdrawn or removed from the adsorption filter.

In accordance with still another feature of the invention, each slider is formed by a cross member of a T-shaped profile part. Thereby, the damming or baffling effect of the side walls on the downwardly trickling adsorption medium is suppressed, and the flow-cone below the slots between the louver-like, roof-shaped components and form without interference.

To prevent the trickling down of the adsorption medium, when the sliders are in the closed position, there are provided in accordance with still a further feature of the invention, small brushes at the lower roof edges of the louver-like roofs, the small brushes being seated on the sliders. The brushes simultaneously permit the passage of the gas to be cleaned in the region of the slider.

In accordance with a concomitant feature of the invention, there is provided an adsorption filter wherein, of the roof gaps distributed over the whole filter area, those gaps in the middle region have their smallest, largest and intermediately dimensioned gap widths smaller than the corresponding smallest, largest and intermediately dimensioned gap widths of the roof gaps in the side regions.

Other features which are considered as characteristic for the invention are set forth in the appended claims.

Although the invention is illustrated and described herein as embodied in a moving bed filter, especially an adsorption filter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
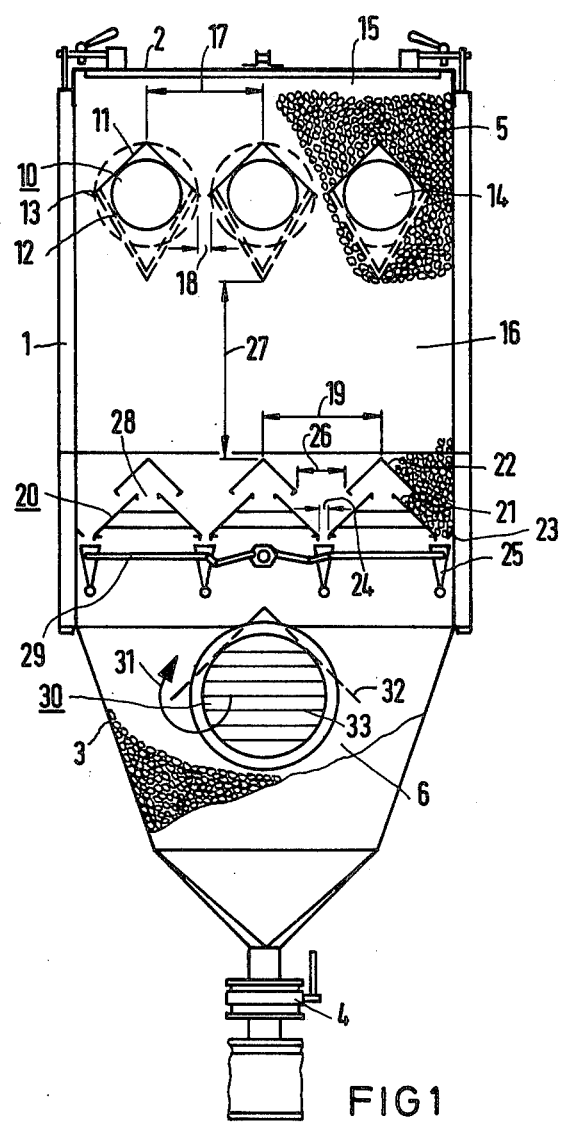
FIG. 1 is a diagrammatic longitudinal sectional view of an adsorption filter according to the invention.

Referring now to the drawing and, first, particularly to FIG. 1 thereof, there is shown a longitudinal sectional view of an adsorption filter in the form of a loose-material filter, wherein the active height of the adsorption medium layer is a multiple of the theoretical minimum layer height for safety reasons. A filter of this type has a high degree of efficiency for the adsorption medium, if only that layer of the adsorption medium is removed which has been actually used up. This assumes that the adsorption medium in the active zone of the filter descends uniformly over the entire cross section, and the fresh adsorption medium trickles uniformly into the active zone as replacement. Then, the removal of the used adsorption medium can be effected one or more times during operation without shutting down the equipment.

The illustrated filter is especially suitable for the purification of contaminated air, for example, air contaminated by radio-active iodine in a nuclear power plant, and the filter is, for this purpose, charged with a specially prepared, activated charcoal. The filter construction which is provided ensures both that the air to be cleaned passes through, uniformly distributed over the entire cross section, as well as a plane-parallel, friction-free input and output of the adsorption medium in the region of the active zone.

The illustrated adsorption filter is formed primarily of a box-shaped container 1 with a closeable cover 2, a downwardly, conically tapering tunnel-shaped bottom 3 with a discharge opening and an associated closure 4, upper components 10, lower components 20 and a gas supply inlet 30. Adsorption medium 5 is disposed essentially in the region between the lower components 20 and the cover 2, and completely fills the space between the lower components 20 and the upper components 10. Instead of the removable and replaceable cover 2, in general, a closeable inlet opening could be provided, such as for example, a charging or throughput control device located in the narrowest cross section of a conical or pyramidal tapered feed chamber.

The gas which is to be purified enters, according to the arrow 31, through the gas supply inlet 30 into the filter, the inlet pipe of the gas supply inlet 30 is protected against downwardly falling adsorption medium by a pointed or peaked roof 32 and a large-area sieve or screen 33. The gas is discharged from the filter through the upper components 10, which are formed of exhaust gas or discharge tubes arranged parallel to one another and extending from the front to the rear wall of the container housing. The exhaust gas discharge tubes are formed of an upper roof-like cover 11 and a downwardly directed, V-shaped sieve-like cover 12, the roof edges 13 of each upper cover projecting beyond the respective downwardly directed covers. The exhaust-gas discharge tubes 10 are connected to collecting tubes or manifolds 14 which are fastened by otherwise non-illustrated flanges to the rear wall of the container housing.

The exhaust-gas discharge tubes 10 simultaneously form flow-guide elements for uniformly distributing the adsorption medium 5 present in the storage space 15 into the adsorption space 16.

For this purpose, the distance 17 between the axes thereof is in a range between 100 to 500 mm depending upon the structural size of the filter, the spacing of these axes being about six times the dimension of the roof gaps 18 between two adjacent flow-guide elements and between a flow element and the container wall, respectively. Half the peak angle (section plane of a roof surface with the vertical) of the roof-shaped covers 11, which are formed of stainless steel in order to have a favorable coefficient of friction, is about 45°; thus the peak angle of the covers 11 is about 90° and is greater than the peak angle of the V-shaped covers 12. The angle of inclination which is complementary to half the peak angle of the roof-shaped covers 11 is also about 45°, while the complementary inclination angle of the V-shaped covers 12 is correspondingly greater. For different choice of materials, the peak angles should be adjusted for the corresponding friction coefficient.

The adsorption material which is filled-in from above meets in the lower region of the housing 1 with the structural components in the form of a support grate 20, which include construction elements for supporting the adsorption materials, for uniformly introducing the gas to be purified into the adsorption space 16, and for uniform discharge or removal of a used and laden layer, respectively, of the adsorption medium. The support grate 20 is formed of louver-like bipartite symmetrical roofs with a trapezoidal lower part 21 and a peak or roof-like upper part 22. These roofs are arranged vertically below respective exhaust-gas discharge tubes 10 and parallel thereto in such a manner that the distances 19 between the axes thereof are also about six times the width of the lower roof-gaps 24 between two adjacent louver-like roofs and between a louver-like roof and the adjacent housing wall, respectively. It is advantageous to connect the respective housing wall with the lower part 23 of a trapezoidal lower part. In this manner, slits 24 are formed not only between the louver-like or jalousie-like roofs, but also between the outer louver-like roofs and the lateral housing walls, which can be closed by sliders 25 which are coupled with one another, are arranged at the underside of the support grate, and sweep over the axial length of the support grate.

The trapezoidal lower part 21 and the peak-shaped upper part 22 of each louver-like roof 20, depending upon the structural size, have a vertical distance therebetween of about 50 to 90 mm, while the roof gaps 26 between the roof-like upper parts 22 have a width of from 50 to 100 mm. The dimensions of the lower roof gaps 24 correspond to those of the slots 18 between the upper components 10.

The width of the upper slots 28 of the trapezoidal underside 21 is from 20 to 80 mm, these slots, together with the louver-like form of the lower components, being provided in a conventional manner for permitting passage of the gas through the support grate 20. Furthermore, the louver-like shape of the support grate 20 effects a pulsation and loosening of the adsorption medium during downward movement thereof, and thereby prevents the formation of bridges when the adsorption medium is withdrawn or removed.

The half peak angle and, correspondingly, the inclination angle of all the inclined roof surfaces of the support grate 20 are about 45°. The support grate, similar to the roof-shaped covers 11, is formed of stainless steel.

The adsorption space 16 i.e. the active zone of the filter is defined by the distance 27 between the upper points or peaks of the support grate 20 and the lower points of the upper components 10. This distance 27 is from 200 to 1000 mm, depending upon the structural size of the device.

The shut-off devices which are arranged in a conventional manner in vicinity of the lower roof-gaps 24 are constructed, as aforementioned, in the form of sliders 25 which completely open the roof gaps 24 whenever a used and laden layer, respectively, of the adsorption medium is to be removed, and thereby permit an unobstructed trickling-out of the adsorption medium under massflow conditions. For this purpose, the sliders 25 are connected to one another by a system of rods or levers 29 which can be operated from the outside either by hand or by motor.

The adsorption material trickling through the roof gaps 24 arrives in free-fall in the operating space 6 wherein one or more charges are collected and thereafter discharged, free of contaminations, into a container which is arranged below the closure valve 4.

Figure 2:
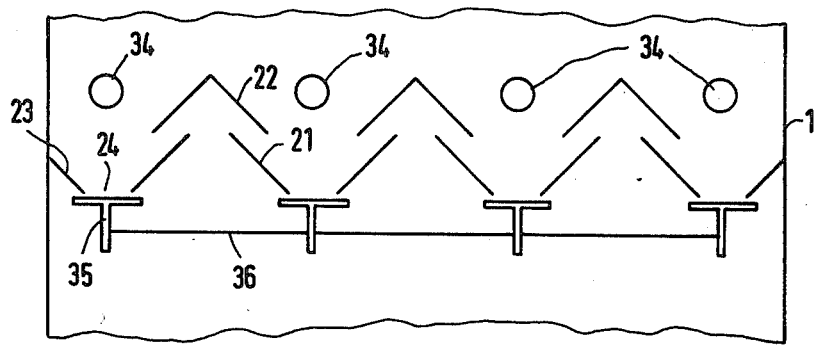
FIG. 2 is an enlarged fragmentary view of FIG. 1 showing the support grate of the filter with a modified construction of the slides thereof.

According to the diagrammatic view of FIG. 2, an especially advantageous arrangement of the sliders 25 is achieved if they are formed of T-shaped elements 35 which are connected to one another by one or more rails 36. Thereby, disturbances of the flow-cone of outwardly trickling adsorption medium are avoided when the sliders 35 are open. The flow process per se in this example is controlled by round, tube-shaped flow-guideelements 34 which are arranged between the peak or roof-like upper sides 22 as well as between the latter and the housing walls. Furthermore, according to another embodiment shown in FIG. 3, plastic-material or steel brushes 37 are provided at the bottom edges of the trapezoidal lower parts 21 and prevent an unintentional trickling-away of the adsorption medium when the slider is closed, and simultaneously permit unobstructed passage of the gas through the roof-gaps 24.

Figures 3, 4, 5:
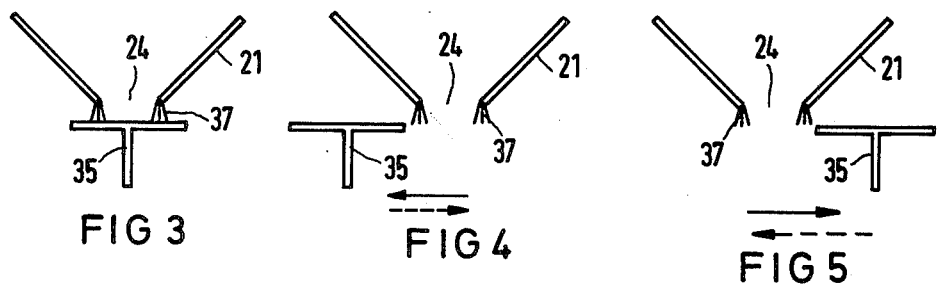
FIGS. 3 to 5 are diagrammatic representations of the motion-rhythm of the sliders according to FIG. 2, whereby the lower edges of the roof-like support tubes are provided with brushes cooperating with the sliders.

For opening and closing the roof gaps 24, the drive 29 for the sliders 35 is advantageously so constructed that the sliders 35 according to FIGS. 4 and 5 can be shifted alternatingly to one and then to the other side of the respective roof gap 24. Assurance is thereby provided that the individual zones of the roof gaps 24 have in total a uniform opening time. It is recommended that the container 1 be provided with non-illustrated bulges for this operation of the slider, so that the respective outer slider can completely clear the respective roof-gap when the slider is shifted in direction toward the container.

A reciprocatory motion of throughput control elements in the form of a field of ledges or strips which are actuated by an eccentric drive is known from U.S. Pat. No. 1,095,676, which was mentioned hereinbefore. Therein, the ledges or strips which are arranged closely above the retention or accumulation surfaces and just below the roof gaps to effect the trickling-away or conical heaps of material which form on the retention surfaces; in contrast to the invention, the objective therein is not to close the roof gaps or open the roof gaps completely with regard to the filter mass by the operation of the sliders.

Figure 6:
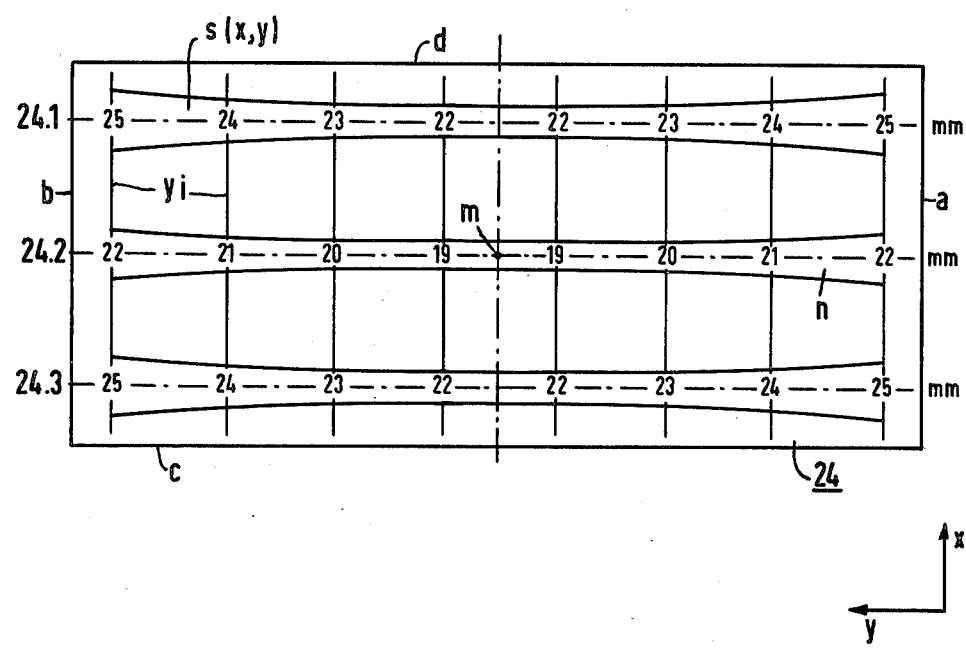
FIG. 6 is a diagrammatic plan view of the support grate showing the hyperbolic shapes of the gaps between the roof-like structures thereof.

A third embodiment of the filter according to FIG. 1 is shown in FIG. 6, which is a cross-sectional view of the container 1 at the level of the roof gaps 24 of the support grate 20. One can see that the roof gaps 24 from the edge (long sides a, b) up to the vertical median plane m is approximately hyperbolically narrowed or constricted. Advantageous gap widths s (x, y) expressed in mm for the adsorption filter shown in FIG. 1 are introduced into FIG. 6 at representative section planes $y_i$ are shown. The gap width s, as indicated by the term s(x, y), depends not only on the y-coordinate, which is oriented in the direction of the filter width c and d, respectively, but rather depends also on the x-coordinate which extends parallel to the longitudinal filter sides a and b, respectively (compare to the small coordinate intersection or cross x/y). In general, it can be stated that, of the three roof gaps 24 which are distributed over the whole base area of the filter and which are identified in FIG. 6 by reference characters 24.1, 24.2 and 24.3, the gaps in the middle region i.e. reference character 24.2, having their smallest, largest and intermediate gap widths dimensioned smaller than the corresponding gap widths 24.1, 24.3 in the edge or side regions. For the latter, the following staggered values are given from the most narrow portion of the roof gap in the middle region to the side region (in mm): 22-23-24-25. For the somewhat more narrow median roof gap 24.2 which extends to both sides of the middle symmetry plane n, the following increasing dimensions apply analogously from the middle to the side or edge region: 19-20-21-22.

The explanations given above with the aid of FIG. 6 for the support grate 20 with the roof gaps 24 thereof applies also for the upper components with the roof gaps 18 thereof, so that explanations referring to the upper components can be dispensed with. As mentioned hereinbefore, wall friction losses of the adsorption medium in the edge or side region are taken into account by the approximately hyperbolic constriction of the roof gaps from the sides or edges towards the middle, and by a widening or expansion of the roof gaps from the middle region toward the walls, respectively, i.e. compensation for the wall friction is achieved with the intent of attaining layers which are as plane-parallel as possible as the layers of the filter medium progress. The cause of the gap width depends upon the size of the container and of the filter layer; for the experimental determination of the exact dimensions of the gap width, a closed model of the filter with a transparent glass wall can be used to observe well the extent to which the desired mass flow has been achieved.

The dimensions and roof inclinations of the upper components 10 and of the support grate 20, which were described with the aid of the FIGS. 1–6, represent preferred embodiments: as mentioned hereinbefore, it is understood that these configurations can be varied within the scope of the claims. As shown, the symmetrical roofs 21 and 22 are bipartite in the preferred embodiment; the effect of the gas input respectively parallel to and independently of the roof gaps 24 is also possible if the symmetrical roofs 21 and 22 formed of more than two parts, for example of three parts which, for filters with a very large base area, can be of advantage for uniform gas distribution.

There are claimed:

1. Moving bed filter for purifying a fluid medium formed of gas and/or vapor, the filter having a flow of loose particulate material downwardly from above, and a continuous flow upwardly from below of a fluid medium to be filtered, and including a container filled with the loose particulate material and having at least one closeable inlet opening at the top thereof for introducing the loose particulate material, and a downwardly tapering bottom having a closeable outlet port for discharging the loose particulate material, fluid-medium inlet ports disposed in a bottom region and fluid medium exhaust tubes arranged in an upper region of the container and extending parallel to one another from one container wall to the opposite container wall, and being provided at inflow and at outflow sides thereof with an upper roof cover and a lower V-profile cover, respectively, serving as a flow-equalizing symmetrical flow guide element for the loose particulate material, and additional components disposed in the lower region of the container in the form of a support grate for equalizing flow behavior of the loose particulate material over the whole cross section of the container, comprising a downwardly directed V-shaped cover of sieve-like construction connected at each fluid-medium exhaust tube to the upper cover thereof forming a roof-shaped symmetrical flow-guide element, the upper covers being spaced a distance of four to ten times the width of the roof gap between each two adjacent flow guide elements and between a flow-guide element and the container wall, respectively, roof edges of each upper cover projecting beyond the respective downwardly directed V-shaped cover, the support grate being formed of bipartite louver-like symmetrical roofs disposed vertically below each fluid-medium exhaust tube and parallel thereto in a manner that the mutual spacing of the axes thereof is four to ten times the width of the lower roof gaps between each two adjacent louver-like roofs and between a louver-like roof and the container wall, respectively, and sliders disposed at the underside of the support grate for closing the lower roof gaps between the louver-like roofs, said sliders being coupled with one another.

2. Moving bed filter according to claim 1 wherein the flow of loose particulate material is continuous.

3. Moving bed filter according to claim 1 wherein the container has a rectangular cross section.

4. Moving bed filter according to claim 1 wherein the loose particulate material is an adsorption medium, and the filter is an adsorption filter.

5. Adsorption filter according to claim 4 wherein the width of the roof gaps is 15 to 50 mm.

6. Adsorption filter according to claim 5 wherein the width of the upper roof gap between two adjacent louver-like roofs is 50 to 100 mm.

7. Adsorption filter according to claim 4 wherein the roof gaps between the louver-like roofs from the side towards the middle of the container are substantially hyperbolically constricted.

8. Adsorption filter according to claim 7 wherein, of the roof gaps distributed over the whole filter area, those gaps in the middle region have their smallest, largest and intermediately dimensioned gap widths smaller than the corresponding smallest, largest and intermediately dimensioned gap widths of the roof gaps in the side regions.

9. Adsorption filter according to claim 4 wherein the roof gaps between the upper covers, from the side towards the middle of the container are substantially hyperbolically constricted.

10. Adsorption filter according to claim 4, including additional flow guide elements disposed above said lower roof gaps as well as between the roof-shaped upper parts of the louver-like roofs and between said upper parts and the respective container wall.

11. Adsorption filter according to claim 10, wherein said additional flow-guide elements have a peaked-roof shape.

12. Adsorption filter according to claim 10 wherein said additional flow-guide elements have a square diamond-shaped cross section.

13. Adsorption filter according to claim 10 wherein said additional flow-guide elements have a rectangular cross section.

14. Adsorption filter according to claim 10 wherein said additional flow-guide elements have a round cross section.

15. Adsorption filter according to claim 4 wherein the upper roof-shaped covers and the support grate are formed of stainless steel, and have an inclination angle of about 45°.

16. Adsorption filter according to claim 4 wherein the peak angle of the surfaces of the V-shaped covers is smaller than the peak angle of roof-shaped covers.

17. Adsorption filter according to claim 4, wherein the sliders are slidable on both sides of the roof gaps.

18. Adsorption filter according to claim 17 wherein the sliders are slidable alternatingly to one side and to the other side for opening the roof gaps.

19. Adsorption filter according to claim 4 wherein each of said sliders is formed by cross member of a T-shaped profile part.

20. Adsorption filter according to claim 19 including small brushes at lower roof-edges of said louver-like roofs, said small brushes being seated on the sliders.

* * * * *